Dec. 19, 1961  E. O. LINDSTROM  3,014,145

ASYNCHRONOUS MOTOR STATOR

Original Filed Dec. 9, 1957

INVENTOR.
Ernest Olof Lindstrom
BY
his ATTORNEY 3,014,145
ASYNCHRONOUS MOTOR STATOR
Ernst Olof Lindstrom, Stockholm-Vallingby, Sweden, assignor to Aktiebolaget Electrolux, Stockholm, Sweden, a corporation of Sweden
Original application Dec. 9, 1957, Ser. No. 701,429. Divided and this application Dec. 11, 1958, Ser. No. 783,068
4 Claims. (Cl. 310—258)

My invention relates to single-phase asynchronous motors having a stator provided with main and auxiliary windings. This application is a division of my application Serial No. 701,429, filed December 9, 1957, for Insulated Field Winding for Dynamo-Electric Machines and Method of and Apparatus for Making Same.

It is an object of my invention to provide an improved stationary core structure for single-phase asynchronous motors having main and auxiliary windings. I accomplish this by providing a stationary core structure of annular form having slots at the inner periphery thereof and diametrically opposed curved surfaces and diametrically opposed flat surfaces between the curved surfaces at the outer periphery thereof, and arranging a main winding in the slots at the region of the core structure at which the outer periphery is curved and an auxiliary winding in the slots at the region of the core structure at which the outer periphery is flat.

Further objects and advantages of my invention will become apparent as the following description proceeds, and the features of novelty which characterize my invention will be pointed out with particularity in the claims annexed to and forming a part of this specification.

Figure 1:
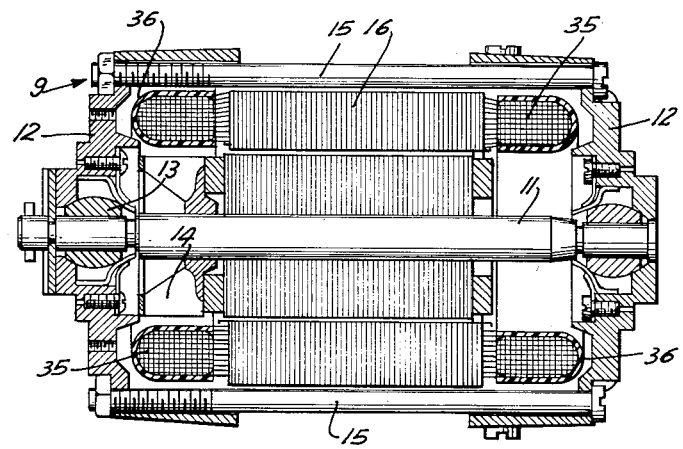
Figure 2:
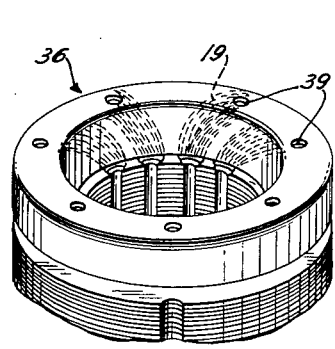
Figure 3:
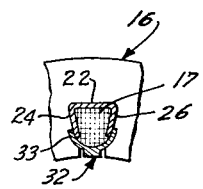
Figure 4:
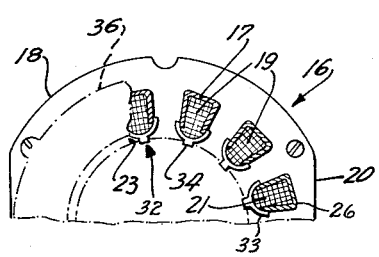
Figure 5:
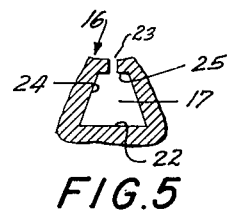

In the drawings, FIG. 1 is a vertical sectional view of a single phase asynchronous motor embodying my invention; FIG. 2 is a perspective view of an end of the stator of the motor shown in FIG. 1; FIG. 3 is a fragmentary cross-sectional view of the stator shown in FIGS. 1 and 2 to illustrate the insulation details therein; FIG. 4 is an end view, partly in section, of the stator shown in FIGS. 1 and 2; and FIG. 5 is a fragmentary cross-sectional view of the stator shown in FIGS. 1 and 2.

Referring to FIG. 1, I have shown my invention embodied in a single-phase asynchronous motor 9 having a short-circuited rotor 10 fixed to a shaft 11 having the opposite ends thereof journaled in bearings 13 fixed in bearing brackets which form end frames 12 of the stator frame of the motor. A fan 14 is fixed to the shaft 11 between one end of the rotor 10 and the bearing bracket 12 adjacent thereto for circulating cooling air through the motor 9.

The stator of the motor includes a laminated iron core structure of annular form 16 which is held between the end frames 12 by elongated threaded bolts 15 having tightening nuts. The core structure 16 is provided with a number of slots 17 having openings 23 at the inner periphery thereof, the slots being divided into two groups to receive coils of a main winding 19 and an auxiliary winding 21.

In accordance with my invention eight slots 17 are provided at diametrically opposite regions of the cylindrical-shaped portions 18 of the core structure 16 which receive the coils of the main winding 19, and four slots are provided at diametrically opposite regions of the flattened side portions 20 of the core structure which receive the coils of the auxiliary winding 21. A capacitor (not shown) is connected in the auxiliary winding 21 to facilitate starting the motor 9, whereby the current in the auxiliary winding will be 90 electrical degrees or one-half pole step out of phase with the current in the main winding 19. If desired, a centrifugally operated switch may be provided in the auxiliary winding circuit 21 to open the latter when the motor 9 reaches 60 to 80% of its rated speed. In place of a capacitor, resistive and inductive resistances may be employed in the auxiliary winding circuit 21 to obtain the phase shift of current therein.

As best shown in FIG. 5, the slots 17 are of keystone shape having flat bottoms 22 and inclined sides 24 which converge toward one another toward the openings 23, the slots further including flat inner wall portions 25 extending from the sides 24 to the openings 23. The flat inner wall parts 25 at the vicinities of the openings 23 effectively serve to retain the coils of the windings 19 and 21 in the slots 17.

The windings 19 and 21 may be formed of thin copper wire which is enameled or varnish-insulated and wound into a number of coils each having a given number of turns, the individual turns of each coil being held together at one region thereof by suitable adhesive tape, for example. In both the main winding 19 and auxiliary winding 21, the coils forming each winding desirably are wound from a single length of wire.

The insulation for each slot 17 of the core structure 16 comprises a three-sided member 26 of insulating material which bears against the bottom 22 and sides 24 of the slot and forms a lining therein, as shown in FIGS. 3 and 4.

After each side of a coil is inserted in a slot 17, a second insulating member 32 of U-shape is positioned in the slot, as shown in FIGS. 3 and 4. When the U-shaped members 32 are positioned in the slots 17, the outer extremities of the opposing sides 33 thereof overlap the sides of the insulating members 26, and the ridges 34 between the opposing sides 33 are located in the slot openings 23, as best seen in FIG. 4.

The motor 9 is provided with suitable connections (not shown) for connecting it to a source of electrical supply, such connections being connected to the ends of the main and auxiliary windings 19 and 21 and covered with suitable insulating tubing. After the windings 19 and 21 are provided on the core structure 16, the opposing ends 35 of the windings project beyond the ends of the core structure and form so-called winding heads. The adhesive tape provided to hold together the turns of wire of each coil, prior to inserting the coils in the slots, may be located at one end 35 of the windings. In a similar manner, the turns of wire of each coil located at the opposite end 35 of the windings may be held together at one region by suitable adhesive tape.

The winding ends 35 at the end of the core structure 16 are covered by insulating members 36 which are of annular form and essentially U-shaped in section, as shown in FIG. 1. The members 36 are flexible and resilient in character and are so constructed and formed that, when moved lengthwise of the core structure 16 over the winding ends 35, the insulating members 36 may be resiliently fastened to the winding ends due to the resiliency of the insulating members.

In view of the foregoing, it will now be understood that I have provided an improved single-phase asynchronous motor having a stationary core structure formed with slots at the inner periphery thereof which defines a bore of cylindrical shape. All of the slots 17 are of substantially the same depth and have the same sized opening 23 to the bore. Lines extending radially from the axis of the bore through the centers of the slots 17 in which the coils of the main winding 19 are arranged only intersect the regions 18 of the core structure 16 at which the outer periphery is curved, and lines extending from the axis of the bore through the centers of the slots 17 in which the coils of the auxiliary winding 21 are arranged only intersect the regions 20 of the core structure at which the outer periphery thereof is flat. Hence, the coils of the auxiliary winding 21 are angularly displaced about the axis of the bore with respect to the coils of the main winding 19 and in non-overlapping relation with the latter.

While I have shown and described a particular embodiment of my invention, it will be apparent that modifications and changes may be made without departing from the spirit and scope of the invention, as pointed out in the following calims.

What is claimed is:

1. A single-phase asynchronous motor including a stationary core structure of annular form having slots at the inner periphery thereof which defines a bore of cylindrical shape, all of said slots being of substantially the same depth and having the same sized opening to the bore, the outer periphery of said core structure having diametrically opposed curved surfaces and diametrically opposed flat surfaces between the curved surfaces, and a main winding comprising coils arranged in the slots at first regions of the core structure and an auxiliary winding comprising coils arranged in the slots at second regions of the core structure, lines extending radially from the axis of the bore through the centers of the slots in which the coils of the main winding are arranged only intersecting the first regions of the core structure at which the outer periphery thereof is curved and lines extending radially from the axis of the bore through the centers of the slots in which the coils of the auxiliary winding are arranged only intersecting the second regions of the core structure at which the outer periphery thereof is flat, and the coils of the auxiliary winding being angularly displaced about the axis of the bore with respect to the coils of the main winding and in non-overlapping relation with the latter.

2. A single-phase asynchronous motor including a stationary core structure of annular form having slots at the inner periphery thereof which defines a bore of cylindrical shape, all of said slots being of substantially the same depth and having the same sized opening to the bore, the outer periphery of said core structure having a first pair of diametrically opposed curved surfaces and a second pair of diametrically opposed flat surfaces between the first pair of curved surfaces, and a main winding and auxiliary winding each comprising coils arranged in said slots, the coils of said auxiliary winding being angularly displaced about the axis of the bore with respect to the coils of said main winding and in non-overlapping relation with the latter, lines extending radially from the axis of the bore through the centers of said slots in which the coils of said auxiliary winding are arranged only intersecting the regions of said core structure at which the outer periphery thereof is flat.

3. A single-phase asynchronous motor including a stationary core structure of annular form having slots at the inner periphery thereof which defines a bore of cylindrical shape, all of said slots being of substantially the same depth and having the same sized opening to the bore, the outer periphery of said core structure having two pairs of surfaces including a first pair of diametrically opposed curved surfaces and a second pair of diametrically opposed flat surfaces between the first pair of curved surfaces, and a main winding comprising coils arranged in the slots at first regions of the core structure and an auxiliary winding comprising coils arranged in the slots at second regions of said core structure, lines extending radially from the axis of the bore through the centers of the slots in which the coils of the main winding are arranged only intersecting the first regions of the core structure at which the outer periphery thereof is curved and lines extending radially from the axis of the bore through the centers of the slots in which the coils of the auxiliary winding are arranged only intersecting the second regions of the core structure at which the outer periphery thereof is flat, the coils of the auxiliary winding being angularly displaced about the axis of the bore with respect to the coils of the main winding and in non-overlapping relation with the latter.

4. A single-phase asynchronous motor as set forth in claim 2 in which four slots are disposed at each of the first regions of the core structure intersected by said radially extending lines at which the outer periphery is curved and two slots are disposed at each of the second regions of the core structure intersected by said radially extending lines at which the outer periphery is flat.

References Cited in the file of this patent

UNITED STATES PATENTS

| | | |
|---|---|---|
| 2,795,712 | Suhr | June 11, 1957 |
| 2,802,123 | Tweedy et al. | Aug. 6, 1957 |